United States Patent
Chen et al.

(10) Patent No.: US 8,712,018 B2
(45) Date of Patent: Apr. 29, 2014

(54) TESTING APPARATUS AND TESTING METHOD FOR TELEPHONE APPARATUS

(71) Applicant: Wistron Corporation, New Taipei (TW)

(72) Inventors: Pei-Lin Chen, New Taipei (TW);
Hsin-Chun Lee, New Taipei (TW);
Shou-Jung Chang, New Taipei (TW);
Chia-Chien Feng, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 13/787,828

(22) Filed: Mar. 7, 2013

(65) Prior Publication Data
US 2014/0072110 A1 Mar. 13, 2014

(30) Foreign Application Priority Data
Sep. 12, 2012 (TW) .............................. 101133361 A

(51) Int. Cl.
*H04M 1/24* (2006.01)
*H04M 3/08* (2006.01)
*H04M 3/22* (2006.01)
*H04M 3/30* (2006.01)

(52) U.S. Cl.
CPC . *H04M 3/30* (2013.01); *H04M 1/24* (2013.01)
USPC ..................................... 379/27.01; 379/27.03

(58) Field of Classification Search
CPC ....... H04M 1/24; H04M 3/22; H04M 3/2227; H04M 3/2236
USPC .................. 379/1.01, 22.02, 22.08, 26.01, 379/27.01–27.04
See application file for complete search history.

(56) References Cited

U.S. PATENT DOCUMENTS

| | | | |
|---|---|---|---|
| 5,933,475 A * | 8/1999 | Coleman | 379/10.01 |
| 7,236,573 B2 * | 6/2007 | Bachorik et al. | 379/27.01 |
| 2005/0254629 A1 * | 11/2005 | China et al. | 379/24 |
| 2008/0043931 A1 * | 2/2008 | Steele et al. | 379/27.03 |
| 2008/0240370 A1 * | 10/2008 | Wang et al. | 379/30 |

* cited by examiner

*Primary Examiner* — Quoc D Tran
(74) *Attorney, Agent, or Firm* — Jianq Chyun IP Office

(57) ABSTRACT

A testing apparatus and a testing method for a telephone apparatus are disclosed. The testing apparatus includes an audio generator, an audio signal processor, and a noise analyzer. The audio generator transmits a testing audio signal to a receiver of the telephone apparatus. The audio signal processor receives the testing audio signal and an output audio signal. The audio signal processor performs a time-to-frequency transformation operation on a difference between the testing audio signal and the output audio signal to obtain a noise information. The noise analyzer receives the noise information and obtains a maximum noise component among a plurality of noise components respectively corresponding to frequencies in the noise information. The noise analyzer compares the maximum noise component with a predetermined threshold to generate a testing result of the telephone apparatus.

11 Claims, 3 Drawing Sheets

TESTING APPARATUS AND TESTING METHOD FOR TELEPHONE APPARATUS

CROSS-REFERENCE TO RELATED APPLICATION

This application claims the priority benefit of Taiwan application serial no. 101133361, filed on Sep. 12, 2012. The entirety of the above-mentioned patent application is hereby incorporated by reference herein and made a part of this specification.

BACKGROUND OF THE DISCLOSURE

1. Field of the Disclosure

The disclosure generally relates to a testing apparatus and a testing method for a telephone apparatus, and more particularly, to a testing apparatus and a testing method capable of automatically testing a telephone apparatus.

2. Description of Related Art

Conventionally, when telephone apparatuses on the production line are tested before shipment, noises produced in the telephone apparatuses that are within the audible frequency range (20 Hz-20 k Hz) are usually detected by using a specific instrument. However, along with the development of electronic technologies, noises produced by the circuit of a telephone apparatus in any frequency range may affect the signal to noise ratio (SNR) of the telephone apparatus and draw consumer complaints.

To test the sound output by a telephone apparatus intensively, an acoustic room is usually set up and the telephone apparatus is placed in the acoustic room to be tested. Such a technique allows a small number of telephone apparatuses to be closely tested on different frequency ranges. However, with today's mass production of telephone apparatuses, it is too costly and time-consuming to test each telephone apparatus.

SUMMARY OF THE DISCLOSURE

Accordingly, the disclosure is directed to a testing apparatus capable of automatically testing a telephone apparatus.

The disclosure is directed to a testing method capable of automatically testing a telephone apparatus.

The disclosure provides a testing apparatus for a telephone apparatus. The testing apparatus includes an audio generator, an audio signal processor, and a noise analyzer. The audio generator generates a testing audio signal and transmits the testing audio signal to a receiver of the telephone apparatus. The audio signal processor is coupled to the audio generator and the telephone apparatus. The audio signal processor receives the testing audio signal and receives an output audio signal from a speaker of the telephone apparatus. The audio signal processor performs a time-to-frequency transformation operation on a difference between the testing audio signal and the output audio signal to obtain a noise information. The noise information includes a plurality of frequencies and a plurality of noise components respectively corresponding to the frequencies. The noise analyzer is coupled to the audio signal processor. The noise analyzer receives the noise information and obtains a maximum noise component among the noise components respectively corresponding to the frequencies in the noise information. The noise analyzer compares the maximum noise component with a predetermined threshold to generate a testing result of the telephone apparatus.

According to an embodiment of the disclosure, the audio signal processor includes a signal operator, a sampler, and a fast Fourier transformer. The signal operator is coupled to the audio generator and the speaker. The signal operator receives the testing audio signal and the output audio signal and performs a convolution operation on the testing audio signal and an audio response theoretical value to obtain an operation result. The signal operator also calculates a difference between the operation result and the output audio signal to obtain a noise signal. The sampler is coupled to the signal operator. The sampler performs a sampling operation on the noise signal to obtain a discrete noise signal. The fast Fourier transformer is coupled to the sampler. The fast Fourier transformer performs a fast Fourier transform (FFT) operation on the discrete noise signal to obtain the noise information.

According to an embodiment of the disclosure, the noise analyzer includes a first comparator and a second comparator. The first comparator is coupled to the audio signal processor. The first comparator compares the noise components to obtain the maximum noise component. The second comparator is coupled to the first comparator. The second comparator compares the maximum noise component with the predetermined threshold to generate the testing result of the telephone apparatus.

According to an embodiment of the disclosure, the first comparator sequentially compares each of the noise components with a temporary value according to the frequencies. When each of the noise components is greater than the temporary value, the first comparator updates the temporary value to be equal to each of the noise components. After comparing all the noise components with the temporary value, the first comparator sets the temporary value to be equal to the maximum noise component.

According to an embodiment of the disclosure, the noise analyzer further includes a counter coupled to the first comparator. The counter processes a counting action according to the comparison operations of the first comparator.

According to an embodiment of the disclosure, the waveform of the testing audio signal generated by the audio generator is a harmonic wave or a sine wave.

The disclosure provides a testing method of a telephone apparatus. The testing method includes following steps. A testing audio signal is generated and transmitted to a receiver of the telephone apparatus. An output audio signal is received from a speaker of the telephone apparatus, and a time-to-frequency transformation operation is performed on a difference between the testing audio signal and the output audio signal to obtain a noise information. The noise information includes a plurality of frequencies and a plurality of noise components respectively corresponding to the frequencies. A maximum noise component is obtained among the noise components respectively corresponding to the frequencies in the noise information, and the maximum noise component is compared with a predetermined threshold to generate a testing result of the telephone apparatus.

As described above, in the disclosure, an output audio signal is generated through a telephone apparatus according to a testing audio signal, and the output audio signal is subtracted from the testing audio signal to obtain a noise information. Moreover, whether the telephone apparatus is good is determined by determining whether a maximum noise component in the noise information is greater than a predetermined threshold. Namely, in the disclosure, a telephone apparatus can be automatically tested without any acoustic room or a large number of quality assurance staffs. Thereby, the testing cost is effectively reduced, and the accuracy of the testing process is improved.

These and other exemplary embodiments, features, aspects, and advantages of the disclosure will be described and become more apparent from the detailed description of exemplary embodiments when read in conjunction with accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
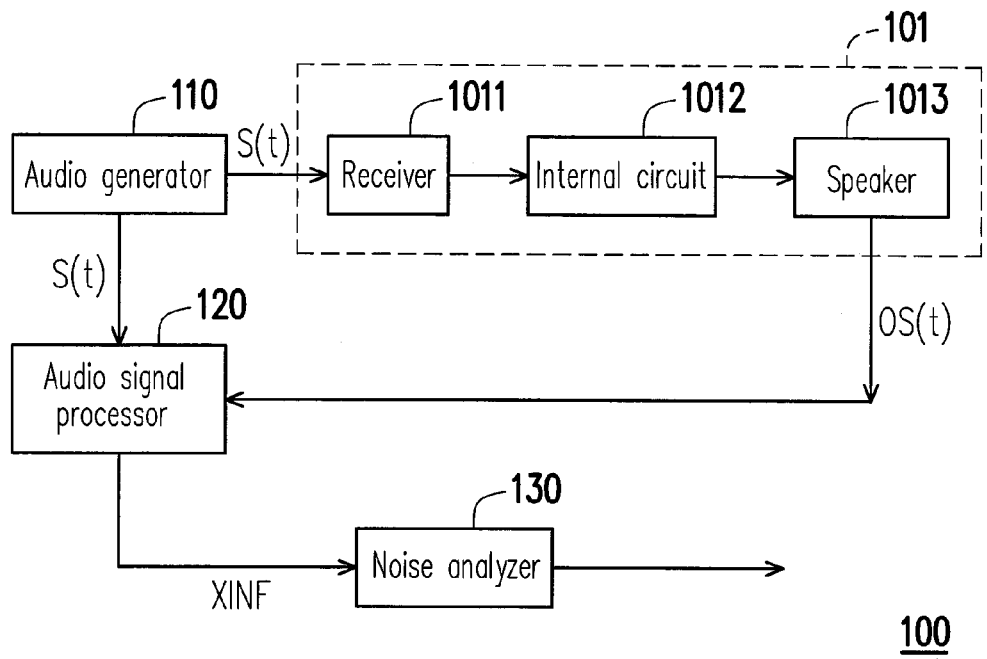
FIG. 1 is a diagram of a testing apparatus 100 for a telephone apparatus 101 according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a diagram of a testing apparatus 100 for a telephone apparatus 101 according to an embodiment of the disclosure. The testing apparatus 100 includes an audio generator 110, an audio signal processor 120, and a noise analyzer 130. The audio generator 110 is coupled to the telephone apparatus 101. The audio generator 110 generates a testing audio signal S(t) and transmits the testing audio signal S(t) to a receiver 1011 of the telephone apparatus 101. After the testing audio signal S(t) is received by the receiver 1011 of the telephone apparatus 101, an output audio signal OS(t) is generated by a speaker 1013 of the telephone apparatus 101 through the processing of an internal circuit 1012. The output audio signal OS(t) is equal to S(t)*r(t)+x(t). Herein S(t)*r(t) means that a convolution operation is performed on the testing audio signal S(t) and a channel response of the telephone apparatus 101, and x(t) is a noise signal. The waveform of the testing audio signal S(t) is a harmonic wave or a sine wave.

The audio signal processor 120 is coupled to the audio generator 110 and the speaker 1013 of the telephone apparatus 101. The audio signal processor 120 receives the testing audio signal S(t) from the audio generator 110 and receives the output audio signal OS(t) from the speaker 1013. In the present embodiment, the audio signal processor 120 first performs a convolution operation on the testing audio signal S(t) and an audio response theoretical value to obtain an operation result and then subtracts the operation result from the output audio signal OS(t) to obtain a noise signal x(t). It should be noted that the audio response theoretical value is preset by the designer, and which is the frequency response to be presented by the telephone apparatus 101 in an ideal state. Besides, after subtracting the operation result from the output audio signal OS(t), S(t)*r(t) is removed from the equation OS(t)=S(t)*r(t)+x(t), and the noise signal x(t) is obtained.

Additionally, the audio signal processor 120 also performs a time-to-frequency transformation operation on the noise signal x(t) to obtain a noise information XINF. The noise information XINF includes a plurality of noise components corresponding to a plurality of frequencies.

The noise analyzer 130 is coupled to the audio signal processor 120. The noise analyzer 130 receives the noise information XINF and obtains the maximum noise component among the noise components respectively corresponding to the frequencies in the noise information XINF. The noise analyzer 130 also compares the maximum noise component with a predetermined threshold to generate a testing result of the telephone apparatus 101.

In short, the noise analyzer 130 first compares all the noise components to find out the maximum noise component. Then, the noise analyzer 130 determines whether the maximum noise component exceeds the predetermined threshold. When the maximum noise component exceeds the predetermined threshold, the noise analyzer 130 determines that the telephone apparatus 101 is not good. Contrarily, when the maximum noise component does not exceed the predetermined threshold, the noise analyzer 130 determines that the telephone apparatus 101 is good.

In addition, the noise analyzer 130 may further record the frequency corresponding to the maximum noise component and provide the information to the tester, such that the tester can determine not only the quality of the telephone apparatus 101 but the frequency on which the telephone apparatus 101 is prone to produce the most noises.

Figure 2:
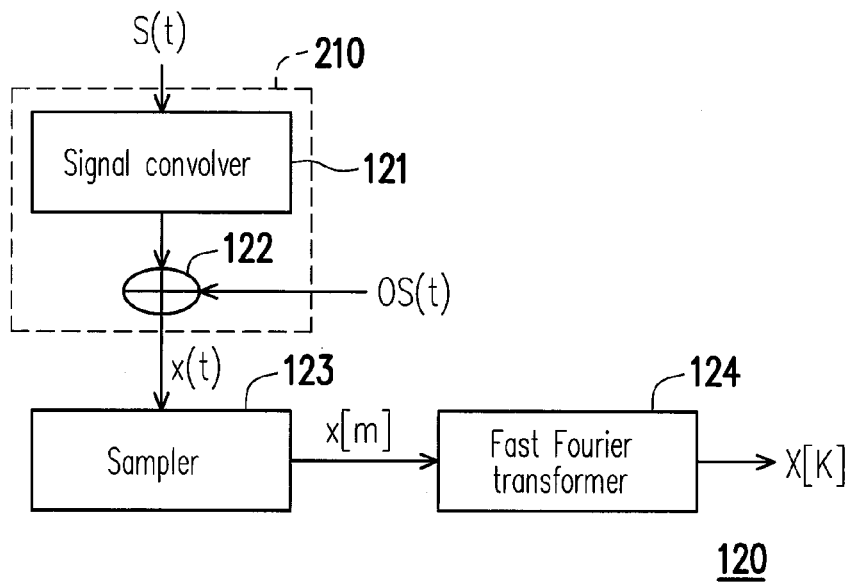
FIG. 2 is a diagram illustrating an implementation of an audio signal processor 120 according to an embodiment of the disclosure.

FIG. 2 is a diagram illustrating an implementation of the audio signal processor 120 according to an embodiment of the disclosure. Referring to FIG. 2, the audio signal processor 120 includes a signal convolver 121, a subtractor 122, a sampler 123, and a fast Fourier transformer 124. The signal convolver 121 and the subtractor 122 form a signal operator 210. The signal convolver 121 receives a testing audio signal S(t) and performs a convolution operation on the testing audio signal S(t) and an audio response theoretical value to obtain an operation result. The subtractor 122 is coupled to the signal convolver 121 and the sampler 123. The subtractor 122 receives the operation result from the signal convolver 121 and an output audio signal OS(t) and subtracts the operation result from the output audio signal OS(t) to obtain a noise signal x(t).

In the present embodiment, after performing the convolution operation on the testing audio signal S(t) and the audio response theoretical value, the signal convolver 121 may further multiply the operation result by −1. Thus, the subtractor 122 can be replaced by an adder, and the noise signal x(t) can be obtained by adding the output audio signal OS(t) to the negative operation result.

The sampler 123 receives the noise signal x(t) from the subtractor 122 and samples the noise signal x(t). Through the sampling operation, the sampler 123 generates a discrete noise signal x[m]. The fast Fourier transformer 124 is coupled to the sampler 123. The fast Fourier transformer 124 receives the discrete noise signal x[m] and performs a fast Fourier transform (FFT) to transform the discrete noise signal x[m] in the time domain into a noise information X[K] in the frequency domain. Herein the noise information X[K] includes a plurality of frequencies and a plurality of noise components respectively corresponding to the frequencies.

Figure 3:
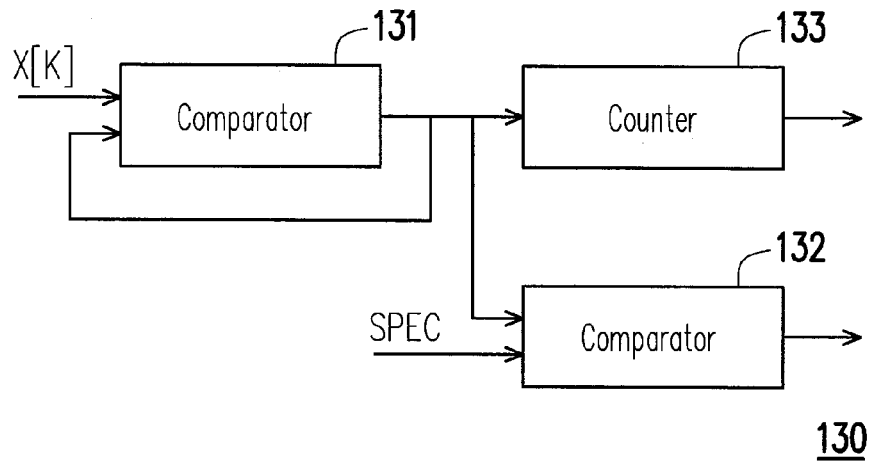
FIG. 3 is a diagram illustrating an implementation of a noise analyzer 130 according to an embodiment of the disclosure.

FIG. 3 is a diagram illustrating an implementation of the noise analyzer 130 according to an embodiment of the disclosure. Referring to FIG. 3, the noise analyzer 130 includes comparators 131 and 132 and a counter 133. The comparator 131 is coupled to the audio signal processor and receives the noise information X[K] from the audio signal processor. The comparator 131 compares the noise components in the noise information X[K] and obtains the maximum noise component. In the present embodiment, the comparator 131 sequentially compares each noise component with a temporary value according to the sequence of the frequencies in the noise information X[K].

The temporary value may be initially set to 0. The comparator 131 first compares the noise component X[1] corresponding to the smallest frequency in the noise information X[K] with the temporary value (=0) and determines that the noise component X[1] is greater than the temporary value (=0). Accordingly, the comparator 131 updates the temporary value to be equal to the noise component X[1], and in following comparison operation, the comparator 131 compares the new temporary value (=X[1]) with the noise component X[2] corresponding to the second smallest frequency in the noise information X[K].

After all the noise components in the noise information X[K] are compared, the final temporary value is equal to the maximum noise component among all the noise components.

The comparison process starting from the noise component corresponding to the smallest frequency in the noise information X[K] is only an implementation example, and a tester may also carry out the comparison process by starting from the noise component corresponding to the greatest frequency in the noise information X[K].

The comparator 132 is coupled to the comparator 131. Herein the comparator 132 receives the temporary value generated by the comparator 131 and compares the temporary value with a predetermined threshold SPEC. When the comparator 132 determines that the temporary value is greater than the predetermined threshold SPEC, the comparator 132 outputs a testing result indicating that the telephone apparatus is not good. Contrarily, when the comparator 132 determines that the temporary value is not greater than the predetermined threshold SPEC after the comparator 131 finishes the comparison operation on all the noise components, the comparator 132 outputs a testing result indicating that the telephone apparatus is good.

Herein the predetermined threshold SPEC is preset by the tester, and which is the maximum permissible noise value of the telephone apparatus.

The counter 133 is coupled to the comparators 131 and 132. The counter 133 processes a counting action for counting the comparison operations of the comparator 131. When the comparator 132 determines that the temporary value is greater than the predetermined threshold SPEC, the tester can determine the frequencies corresponding to the noise components exceeding the predetermined threshold SPEC based on the counting result of the counter 133.

Figure 4A:
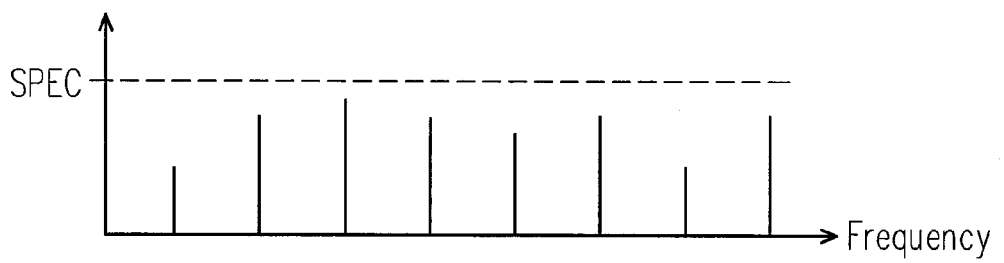
FIG. 4A and FIG. 4B are diagrams respectively illustrating noise information of different telephone apparatuses.
Figure 4B:
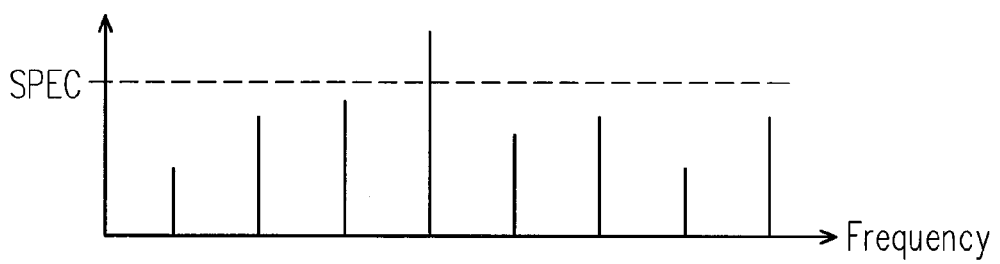

FIG. 4A and FIG. 4B are diagrams respectively illustrating noise information of different telephone apparatuses. In FIG. 4A, all the noise components in the noise information of the telephone apparatus are smaller than the predetermined threshold SPEC. Thus, the telephone apparatus in FIG. 4A is a good telephone apparatus. Contrarily, in FIG. 4B, a noise component in the noise information of the telephone apparatus is greater than the predetermined threshold SPEC. Thus, the telephone apparatus in FIG. 4B is not a good telephone apparatus.

Figure 5:
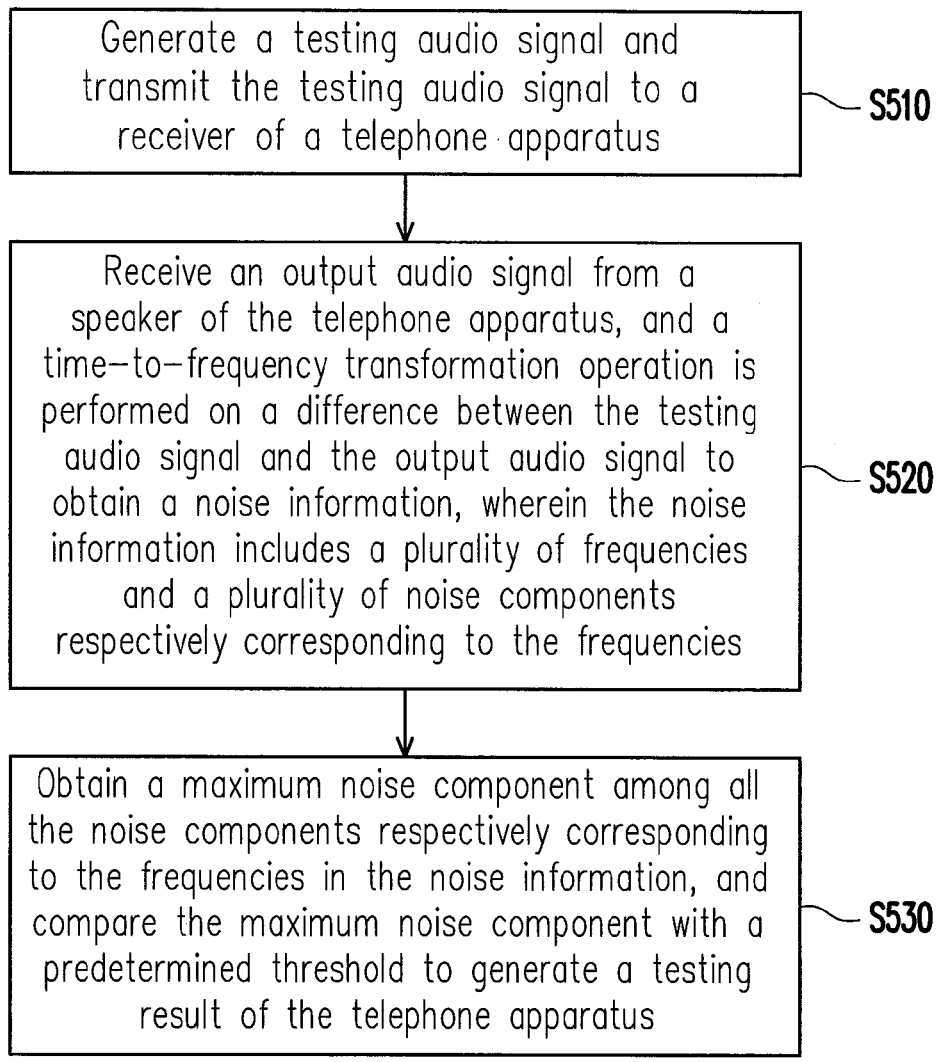
FIG. 5 is a flowchart of a testing method of a telephone apparatus according to an embodiment of the disclosure.

FIG. 5 is a flowchart of a testing method of a telephone apparatus according to an embodiment of the disclosure. Referring to FIG. 5, the testing method includes following steps. First, in step S510, a testing audio signal is generated and transmitted to the receiver of a telephone apparatus. Then, in step S520, an output audio signal is received from the speaker of the telephone apparatus, and a time-to-frequency transformation operation is performed on the difference between the testing audio signal and the output audio signal to obtain a noise information. Herein the noise information includes a plurality of frequencies and a plurality of noise components respectively corresponding to the frequencies. In step S530, a maximum noise component among all the noise components respectively corresponding to the frequencies in the noise information is determined, and the maximum noise component is compared with a predetermined threshold to generate a testing result of the telephone apparatus.

Details of the telephone apparatus testing method has been described in foregoing embodiments therefore will not be described herein.

As described above, in the disclosure, a testing audio signal is transmitted to a telephone apparatus, and a time-to-frequency transformation operation is performed on the difference between the testing audio signal and an output audio signal to obtain a noise information. Moreover, in the disclosure, the quality of a telephone apparatus is determined by detecting whether each of a plurality of noise components corresponding to a plurality of frequencies in the noise information exceeds a predetermined threshold. Thereby, a large number of telephone apparatuses can be automatically tested, so that the testing time and cost can be effectively reduced and the products can be made more competitive.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A testing apparatus, for testing a telephone apparatus, the testing apparatus comprising:
    an audio generator, generating a testing audio signal and transmitting the testing audio signal to a receiver of the telephone apparatus;
    an audio signal processor, coupled to the audio generator and the telephone apparatus, receiving the testing audio signal, receiving an output audio signal from a speaker of the telephone apparatus, and performing a time-to-frequency transformation operation on a difference between the testing audio signal and the output audio signal to obtain a noise information, wherein the noise information comprises a plurality of frequencies and a plurality of noise components respectively corresponding to the frequencies; and
    a noise analyzer, coupled to the audio signal processor, receiving the noise information, obtaining a maximum noise component among the noise components respectively corresponding to the frequencies in the noise information, and comparing the maximum noise component with a predetermined threshold to generate a testing result of the telephone apparatus.

2. The testing apparatus according to claim 1, wherein the audio signal processor comprises:
    a signal operator, coupled to the audio generator and the speaker, receiving the testing audio signal and the output audio signal, performing a convolution operation on the testing audio signal and an audio response theoretical value to obtain an operation result, and calculating a difference between the operation result and the output audio signal to obtain a noise signal;

- a sampler, coupled to the signal operator, and performing a sampling operation on the noise signal to obtain a discrete noise signal; and
- a fast Fourier transformer, coupled to the sampler, and performing the time-to-frequency transformation operation on the discrete noise signal to obtain the noise information, wherein the time-to-frequency transformation operation is a fast Fourier transform (FFT) operation.

3. The testing apparatus according to claim 1, wherein the noise analyzer comprises:
- a first comparator, coupled to the audio signal processor, the first comparator compares the noise components and obtaining the maximum noise component; and
- a second comparator, coupled to the first comparator, the second comparator compares the maximum noise component with the predetermined threshold to generate the testing result of the telephone apparatus.

4. The testing apparatus according to claim 3, wherein the first comparator sequentially compares each of the noise components with a temporary value according to the frequencies, when each of the noise components is greater than the temporary value, the first comparator updates the temporary value to be equal to each of the noise components, and after comparing all the noise components with the temporary value, the first comparator sets the temporary value to be equal to the maximum noise component.

5. The testing apparatus according to claim 3, wherein the noise analyzer further comprises:
- a counter, coupled to the first comparator, and the counter processes a counting action according to a comparison operation of the first comparator.

6. The testing apparatus according to claim 1, wherein a waveform of the testing audio signal generated by the audio generator is a harmonic wave or a sine wave.

7. A testing method of a telephone apparatus, comprising:
- generating a testing audio signal and transmitting the testing audio signal to a receiver of the telephone apparatus;
- receiving an output audio signal from a speaker of the telephone apparatus, and performing a time-to-frequency transformation operation on a difference between the testing audio signal and the output audio signal to obtain a noise information, wherein the noise information comprises a plurality of frequencies and a plurality of noise components respectively corresponding to the frequencies; and
- obtaining a maximum noise component among the noise components respectively corresponding to the frequencies in the noise information, and comparing the maximum noise component with a predetermined threshold to generate a testing result of the telephone apparatus.

8. The testing method according to claim 7, wherein the step of receiving the output audio signal from the speaker of the telephone apparatus and performing the time-to-frequency transformation operation on the difference between the testing audio signal and the output audio signal to obtain the noise information comprises:
- performing a convolution operation on the testing audio signal and an audio response theoretical value to obtain an operation result;
- calculating a difference between the operation result and the output audio signal to obtain a noise signal;
- performing a sampling operation on the noise signal to obtain a discrete noise signal; and
- performing a FFT operation on the discrete noise signal to obtain the noise information.

9. The testing method according to claim 7, wherein the step of obtaining the maximum noise component among the noise components respectively corresponding to the frequencies in the noise information comprises:
- sequentially comparing each of the noise components with a temporary value according to the frequencies;
- when each of the noise components is greater than the temporary value, updating the temporary value to be equal to each of the noise components; and
- after all the noise components are compared with the temporary value, setting the temporary value to be equal to the maximum noise component.

10. The testing method according to claim 9, wherein the step of obtaining the maximum noise component among the noise components respectively corresponding to the frequencies in the noise information further comprises:
- counting according to a comparison operation of the first comparator.

11. The testing method according to claim 9, wherein a waveform of the testing audio signal generated by the audio generator is a harmonic wave or a sine wave.

* * * * *